Jan. 8, 1929.
G. A. TAYLOR
1,698,323
DISPLAY DEVICE
Filed Jan. 8, 1923    3 Sheets-Sheet 3
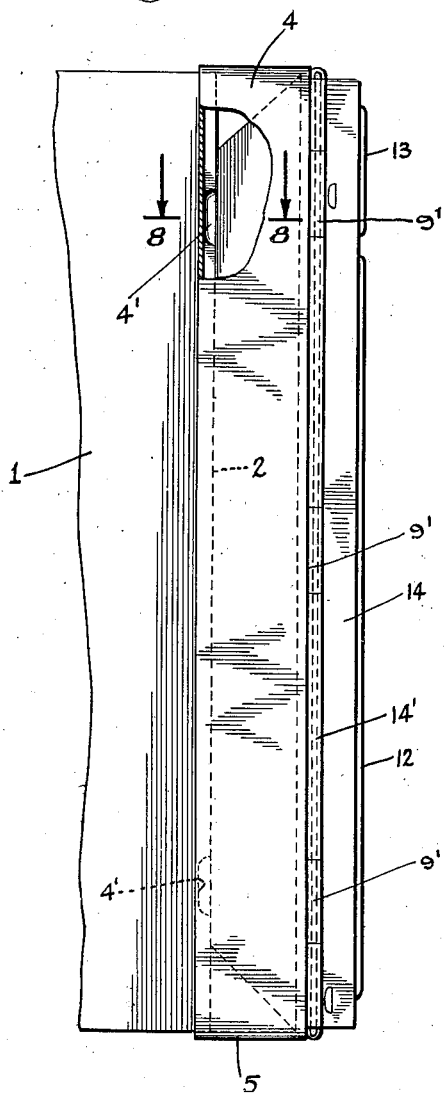
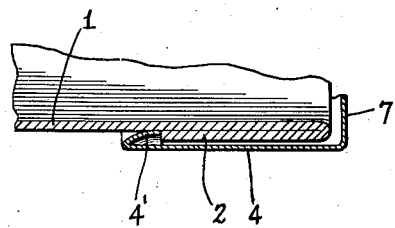
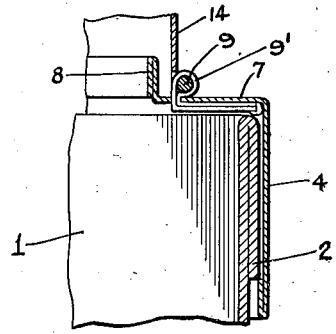

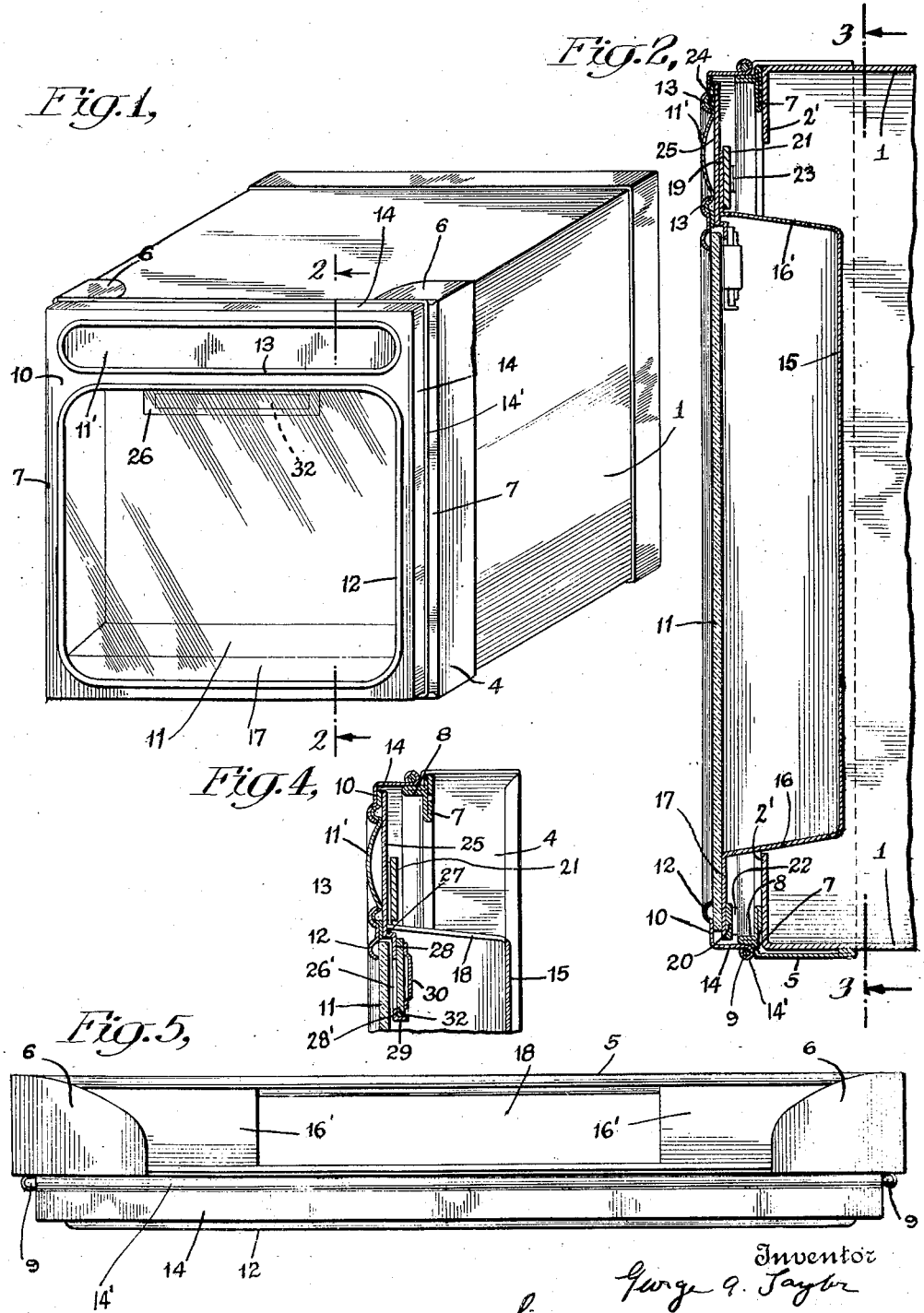

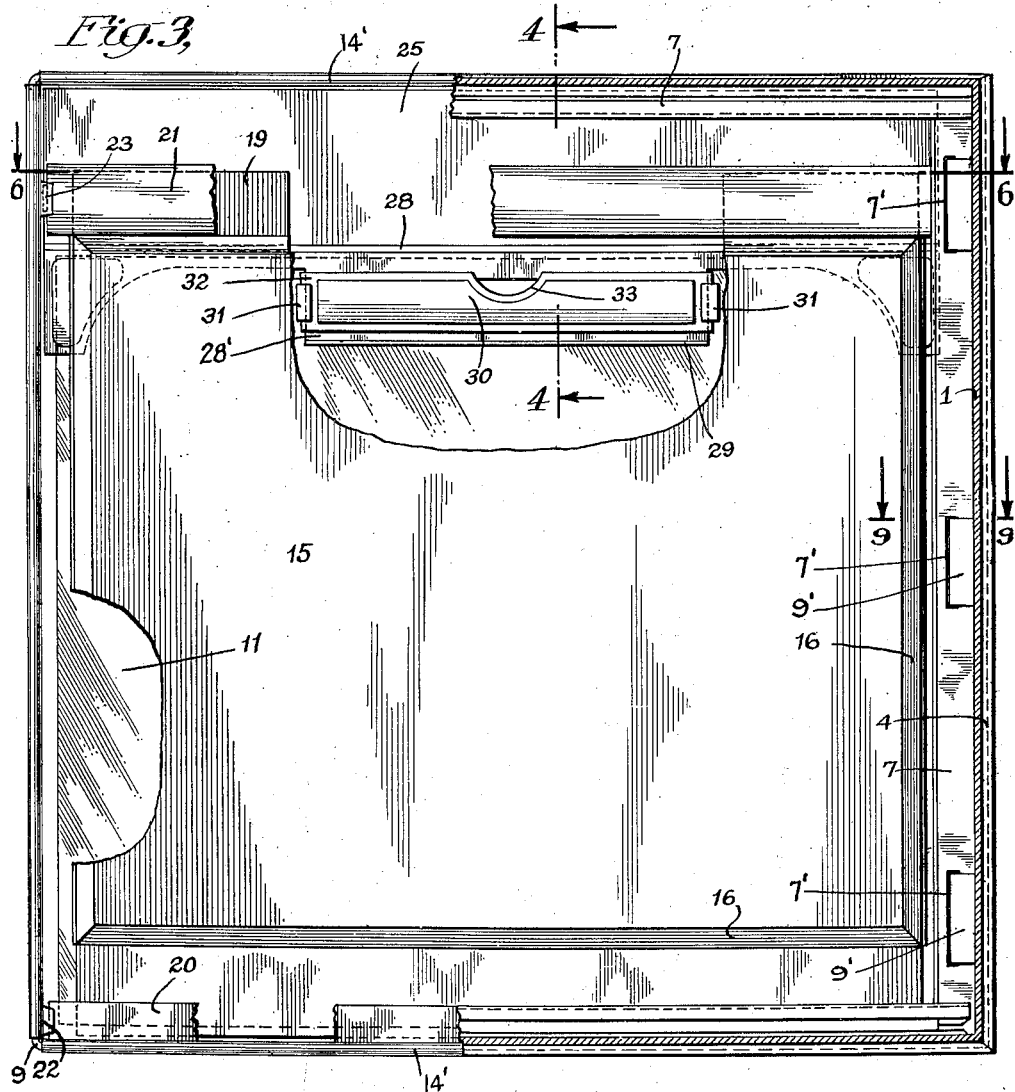
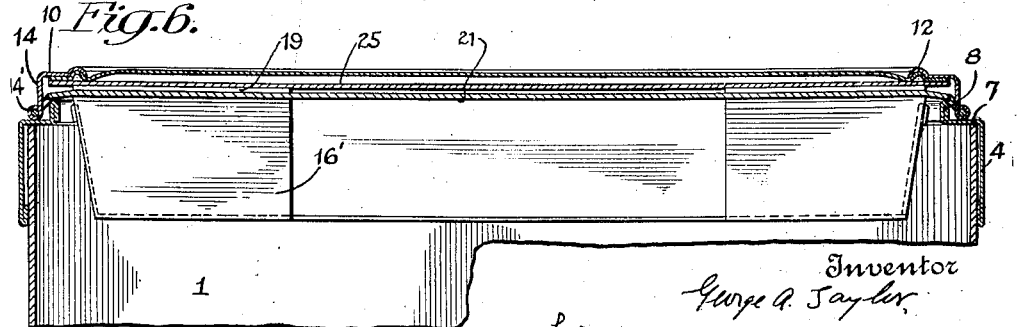

Patented Jan. 8, 1929.

1,698,323

UNITED STATES PATENT OFFICE.

GEORGE A. TAYLOR, OF BERGENFIELD, NEW JERSEY, ASSIGNOR TO NATIONAL BISCUIT COMPANY, OF NEW YORK, N. Y., A CORPORATION OF NEW JERSEY.

DISPLAY DEVICE.

Application filed January 8, 1923. Serial No. 611,233.

This invention relates to an improved type of display device particularly adapted for use in connection with bakers' products, such as biscuits, etc., and viewed in certain aspects the present case presents certain improvements over the previously filed and copending application Serial No. 499,232, filed September 8, 1921.

An object of the invention is directed to the provision in a display front of improved means for retaining and exposing to view the articles to be displayed.

Another object is to provide improved means for retaining in position certain of the parts of a display front.

Still another object is that of providing an improved means for retaining a display front on a receptacle.

An additional object is that of providing a display front which will efficiently accomplish the purposes for which it is intended, which will be economically and readily manufactured and assembled, and in which the various parts will be so arranged that they may be readily removed or replaced.

Other objects of the invention will in part be obvious and will in part appear hereinafter.

The invention accordingly comprises an article of manufacture possessing the features, properties, and the relation of elements which will be examplified in the article hereinafter described and the scope of the application of which will be indicated in the claims.

For a fuller understanding of the nature and objects of the invention reference should be had to the following detailed description taken in connection with the accompanying drawings, in which:

Figure 1 is a perspective view of a receptacle on which is mounted one type of display front contemplated by the invention;

Fig. 2 is an enlarged vertical section taken on the line 2—2 in the direction indicated by the arrows in Fig. 1;

Fig. 3 is a vertical section taken on line 3—3 in the direction indicated by the arrows in Fig. 2;

Fig. 4 is a fragmentary sectional view taken on the line 4—4 in the direction indicated by the arrows in Fig. 3;

Fig. 5 is a top plan view of the display device;

Fig. 6 is a section taken on the line 6—6 in the direction indicated by the arrows in Fig. 3;

Fig. 7 is a side elevation of the display device mounted on the container, part of the frame being broken away to reveal the means for retaining the display device on the container;

Fig. 8 is an enlarged section taken on the line 8—8 in the direction indicated by the arrows in Fig. 7; and Fig. 9 is a fragmentary sectional view taken on the line 9—9 in the direction indicated by the arrows in Fig. 3.

The particular display device or cover exemplified includes a frame or body member which is preferably formed of sheet metal and which comprises a front portion 7, rearwardly-extending side flanges 4, a bottom flange 5 and an interrupted top flange 6. The flanges 4, 5 and 6 are preferably formed with beads at their rear edges and are adapted to fit over the walls of a receptacle, such as indicated at 1, which is formed with an open front that may be originally closed by a removable initial cover. In order to retain the display frame upon the receptacle, there are provided cooperating members on the receptacle and on certain of the flanges, these members being formed in the present instance by bending back portions of the side walls of the receptacle 1 adjacent its front as indicated at 2 and by distorting the beaded edges of the flanges 4 to provide lugs 4' which are adapted to engage the rear edges of bent back portions 2 when the display device is placed across the front of the receptacle.

In the present instance the front surface 7 of the frame is formed with a large rectangular opening, from the edges of which a flange or rail 8 extends in a forward direction, and in order to close this opening there in provided a display front in the nature of a lid or cover, which is preferably formed of sheet metal and which includes a face or front portion 10 having rearwardly-extending flanges 14. The rear edges of the flanges 14 are bent, in the manner indicated at 14', over a wire 9 which extends about the margins of the display front on all four sides thereof, so as to give added stiffness to the construction. At one side of the display front portions of the bent edges are cut away; and, where the wire is thus exposed, metal strips 9' which are attached to the front portion 7 of the frame are bent about the wire 9. The wire 9, the strips 9' and the adjacent portions of the bent-over edge 14' at the one side of the frame thus, in the present instance, constitute respectively the pintle and the two leaves of a hinge by which the display front or cover is swingingly attached to the frame. In order that strips 9' may be securely fastened to the front of the frame, the frame is slit as shown at 7' in Fig. 3, and the strips 9' are extended through these slits and secured against the rear surface of the frame in any suitable manner as by soldering.

The face 10 of the display cover is formed with a large lower opening, across which is disposed a panel 11 composed of transparent material, such as glass, and a smaller upper opening, across which an opaque panel or name-plate 11 extends; the face 10 being preferably beaded about the periphery of these openings, as shown at 12 and 13, respectively.

In the exemplification under consideration there is provided in connection with the display front a pocket member or auxiliary receptacle, which is adapted to contain merchandise for display through the transparent panel, and to maintain this merchandise out of contact with the contents of the receptacle 1. This pocket member may consist of a sheet metal pan comprising a base or rear portion 15, bottom and side portions 16, and a top portion 16', which is interrupted throughout a portion of its length to form an opening 18 through which articles for display may be inserted into and withdrawn from the pocket member. The pan is also provided with flanges 17 and 19 extending outwardly from the bottom portion 16 and the top portion 16', respectively, so that when the pocket member is in place these flanges will lie in a plane parallel to the face of the display front so as to enable the pan readily to be secured in place.

With a view to securing the panels 11 and 11' in position, and also to retain the pocket member, when the latter is desired, there are provided retaining means which comprise in the present instance lower and upper strips 20 and 21, respectively, which are preferably formed of resilient material and attached to the display front in such a manner as to thrust the panels, as well as the flanges 17 and 19, toward the face 10. In order that the upper strip 21 may exert such pressure upon the panel 11 as to thrust it against the face 10 throughout the length of the peripheral bead 13, and, in order that the strip 21 may be employed as a common retaining means for both of the panels, there is interposed between this strip and the panel 11' an auxiliary retaining member 25, which is offset adjacent its lower end, as indicated at 27, and which carries on its offset portion a downward extension or flange 28, which, when the member 25 is in place, will engage the rear surface of the transparent panel 11. The resilient strip 21 thus acts not only to retain the panel 11' in place, but also to hold the upper portion of the panel 11 against the face 10 adjacent the upper portion of the bead 12, while the resilient strip 20 acts to thrust the lower portion of the panel 11 against the face 10. It will be noted that when a pocket member is employed the flange 17 thereof is disposed between the strip 20 and the panel 11, and the flanges 19 are placed between the strip 21 and the auxiliary retaining member 25, so that the strips act to retain in position both the panels and the pocket member or pan.

It is often desirable that an indicia-bearing card or plate be held for display through the transparent panel 11, and to this end the extension 28 of the auxiliary retaining member 25 may carry a card-holder 26, which is formed by extending the flange 28 downwardly, as shown at 28', and forming this extension with an opening 26'. A rearwardly-extending flange 29 provides a bottom for the card-holder, and a strip 30, extending parallel to the extension 28' and spaced therefrom, forms the rear thereof, the ends of the flange 28 being bent rearwardly and inwardly, as indicated at 31, to retain the strip 30 in position. The top of the card-holder is left open, and the strip 30 is cut away as indicated at 33, so that a card 32, or other indicia-bearing member, may readily be removed from or applied to the card-holder.

It is, moreover, desirable that the various parts described may readily be removed from and replaced in the display device, and to this end the retaining strips 20 and 21 are removably attached to the display front at one point, at least, so that they may be either removed altogether from the display front, or moved to such position thereon that they will not interfere with the removal of the pocket member, the auxiliary retaining strip, or the panels. In the present instance, the means by which the strips 20 and 21 are held in place comprise inwardly-extending lugs 22 and 23, respectively, which are formed on the side flanges 14. The ends of the strips 20 and 21 are formed with tongues, which are adapted to be disposed adjacent the lugs 22, 23, and the strips are bowed somewhat, so that the thrust exerted by the resiliency thereof will serve to press against the face 10 the various members interposed between this face and the strips. As is clearly illustrated in Fig. 6, in connection with the strip 21, the lugs formed on the ends of the strips are bent rearwardly so that the strips will be securely held in place under a pair of lugs such as lugs 23, and will be held by one lug of the pair, even when slipped from beneath the other, so as to permit the strips to be swung into and out of position with the latter lug acting as a fulcrum. In practice, if it is desired to remove the strip 21, for example, one end thereof will be pressed downwardly and upwardly so as to detach the tongue at that end of the strip from beneath the cooperating lug, and the strip will then be swung outwardly upon the other lug until it has been moved entirely out of contact with the members disposed in front of it; whereupon, in the present instance, the strip may be readily slipped from under that lug upon which it was swung.

It is believed that the utility of the various features of the invention will be readily apparent from the foregoing. For example, the replacement, removal or substitution of various parts of the display front may be made with extreme ease because of the provision of retaining means such as exemplified by the strips 20 and 21 which may be easily moved out of their operative position. Simplicity of construction and ease of assembly is obtained in various ways, as by the employment of a retaining member common to both panels and by the provision of means, such as exemplified by the marginal wire 9, which acts at once to stiffen the cover and to provide a hinge therefor. The provision of a pocket member, moreover, renders the display front particularly suitable for a number of uses, as when employed in self-service stores in connection with a receptacle for goods such as biscuits. When the display front is employed in this manner, sample articles inserted in the display pocket through an opening such as 18 will be held therein out of contact with the contents of the receptacle, and will not be disturbed or touched by the customer as he removes therefrom articles for purchase. The pocket member is also adapted to secure an attractive display of articles even when the supply of articles in the main receptacle is almost exhausted. Furthermore, by the provision of cooperating retaining members on the main receptacle and the display frame, there is secured an exceedingly efficient arrangement whereby a metallic display member may be securely but temporarily retained on receptacles such as biscuit cartons.

Since certain changes may be made in the above article, and different embodiments of the invention could be made, without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What I claim is:

1. A display device, including, in combination, a frame, a cover member serving as a display front and comprising rearwardly-extending flanges adapted to seat upon said frame, said cover being hinged to said frame and being provided with a window in the face thereof, and a display pan secured to the rear surface of the face of the display front intermediate said flanges and to the rear of said window.

2. The combination of a sheet-metal frame having rearwardly-extending flanges and a sight-opening, a transparent pane closing said opening, and means for retaining said pane in position, said means comprising an integral lug projecting inwardly from one of said flanges and an elongated member bearing against the rear of said pane and having one of its ends detachably engaged by said lug while its other end is engaged at the opposite side of said frame.

3. In display covering devices for containers, the combination of a cover member having a transparent pane in the front thereof and a pocket member carried by said cover member behind said pane, said pocket member comprising a shallow pan having sides, bottom, and a top with an opening therethrough through which articles may be inserted, and vertical flanges extending upwardly and downwardly from the front edges of the top and bottom thereof, respectively, secured to the rear surface of said cover member, said pocket member being closed at its front by said pane and being substantially coextensive, in width and height, with said pane.

4. In display covering devices for containers, the combination of a flanged frame adapted to be removably fitted over the open end of a container, and having a marginal seat, a cover member hinged to said frame, seating upon said seat, and having a transparent pane in the front thereof, and a separable pocket member carried by said cover member, behind said pane and closed at the front thereby, said pocket member comprising a shallow receptacle comprising back, sides and bottom, adapted to contain articles as samples of those contained in the container, said pocket-member being substantially coextensive in width and height with said pane and extending within said frame when the cover member is closed.

5. In display covering devices for containers, the combination of a cover member having a front portion forming a window frame, a transparent pane bearing against the rear surface of said window frame, a pocket member comprising a shallow receptacle behind said pane, having vertical front flanges extending outwardly from opposite edges thereof, and means for securing said flanges against the rear surfaces of said cover member with at least one of said flanges bearing against the rear surface of said pane to press the front surface thereof against the rear surface of said window-frame.

6. In display covering devices for containers, the combination of a cover member having side flanges and a front portion having upper and lower openings, a name plate positioned behind the upper and a transparent pane positioned behind the lower opening, the upper edge of said pane being below the lower edge of said name plate, a strip bearing against the rear surface of said name plate and offset rearwardly adjacent its lower edge to form a rear vertical flange bearing against the rear upper edge of said pane, a portion of said strip being continued downwardly and having a second strip offset therefrom to the rear thereof and secured thereto at the ends to form a pocket for a removable label strip visible through the upper part of said pane, and a spring strip removably secured to the side flanges of said cover member to press said name plate, first named strip, and the upper edge of said pane into place.

7. In display covering devices for containers, the combination of a cover member having side flanges and a front portion having upper and lower openings, a name plate positioned behind the upper and a transparent pane positioned behind the lower opening, a pocket member comprising a shallow receptacle behind said pane, having a vertical front flange extending upwardly from the upper edge thereof, pressing against said name plate and having a vertical front bottom flange pressing against the rear surface of said pane adjacent its lower end, and spring strips removably secured to the side flanges of the cover member to hold the said flanges of said pocket member in place and thereby hold said name plate and pane in place.

8. In display covering devices for containers, the combination of a container having an open front with flanges at front edges thereof bent back against outer surfaces thereof, and a separable cover device having a window in the front thereof and having rearwardly extending flanges adapted to fit against the outer surfaces of the container, some of said flanges having inwardly extending lugs adapted to engage against the rear edges of said rearwardly extending flanges on the container, when the cover device is pressed into position.

9. In display covering devices for containers, the combination of a flanged frame adapted to be mounted upon the open end of a container, and a cover member hinged to and seating upon said frame, and having a transparent pane in the front thereof, said cover member having rearwardly extending flanges the rear edges of which are bent about a marginally-extending wire, said rear edges seating on the front surface of said frame, said wire, at one side of the device, serving as the pintle for the hinge of said cover member.

10. In display covering devices for containers, the combination of a container having an open front with a flange at one front edge thereof extending inwardly of the opening and bearing a label, and a separable cover device having rearwardly extending flanges adapted to fit against the outer surfaces of the container, and having a transparent pane in the front thereof, the label on the front container flange being positioned to be visible through one edge portion of said pane.

11. A device of the character described, including in combination, a frame, a cover member swingingly attached thereto and formed with a display opening, a sheet of transparent material covering said opening and means providing a receptacle or compartment to the rear of said opening and movable with said cover and separable therefrom, the interior of said compartment being visible through said transparent material in order that the contents thereof may be displayed.

12. In a display front for boxes, a frame, a door hinged on the frame and having a display opening, a pan containing a display of the goods stored in the box exposed through the said opening, and means for removably fastening the pan to the door.

13. In a display device, in combination, a display front formed with an opening, a panel for said opening, and resilient means extending across said front and yieldingly bearing against the inner face of said panel to retain the same in position.

14. In a display device, in combination, a display front formed with an opening, a panel for said opening, resilient means extending across said front and yieldingly bearing against the inner face of said panel to retain the same in position, and means for detachably connecting said retaining means with said front.

15. In a display device, in combination, a display front formed with a pair of openings, a pair of panels for said openings, and means common to both of said panels and extending across said front, said means acting against the inner faces of said panels to retain the same in position.

16. In a display device, in combination, a display front formed with a pair of openings, a pair of panels for said openings, means common to both of said panels and extending across said front, said means acting against the inner faces of said panels to retain the same in position, and a pan adapted to be disposed to the rear of one of said panels, said pan being engaged by said panel-retaining means whereby to secure said pan in applied position.

17. In a display device, in combination, a display front formed with an opening, a panel for said opening, and a resilient strip extending across said front and yieldingly bearing against the inner face of said panel to retain the same in position, and means for detachably connecting said strip with said front.

18. In a display device, in combination, a display front, a plurality of panels associated therewith, and means to retain said panels in position comprising a retaining strip mounted on said display front and an auxiliary retaining member interposed between said strip and said panels.

19. In a display device, in combination, a display front formed with an opening in the face thereof, a panel disposed across said opening, and a panel-retaining member mounted at one point on said display front for a swinging movement toward and away from the same and releasably attached to said display front at another point thereon.

20. In a display device, in combination, a display front formed with an opening in the face thereof, a panel disposed across said opening, and a longitudinally-extending panel-retaining member releasably attached at one of its ends to said display front.

21. In a display device, in combination, a body member, a cover hinged thereto, a wire serving as a pintle for said hinge and extending about the marginal edges of said cover to reinforce the same.

22. In a display device, in combination, a body member, a cover hinged to said body member and formed with flanges seating thereon, and a wire serving as a pintle for said hinge and extending about the marginal edges of said cover, the edges of said flanges being bent about said wire.

23. In a display device, in combination, a body member, a cover member, and a wire, the edges of one of said members being coiled around said wire whereby to reinforce such edges, and the edges of the second member connected with said wire whereby the latter serves as a hinge-pintle swingingly connecting said members together.

24. In a device of the character described, in combination, a receptacle having an open front and having protuberances on certain of its sides at points adjacent its front, a display frame for said receptacle, and a plurality of flanges extending rearwardly from said frame and formed with beads at their rear edges, said beads being distorted at certain points to provide means adapted to cooperate with the protuberances on said receptacle to retain the frame in position thereon.

25. In a device of the character described, a sheet metal frame having rearwardly-extending flanges adapted to be removably associated with a receptacle, a panel carried by said frame, and lugs forming an integral part of said flanges and adapted to engage said receptacle whereby to retain the frame in applied position upon the same.

26. In a device of the character described, in combination, a receptacle having an open front and having the front portions of certain of its side walls bent back upon themselves, a cover for said receptable comprising a frame, said frame being formed with rearwardly-extending flanges, and means on certain of said flanges adapted to engage the rear edges of said bent back portions when the cover is in position on the receptacle.

27. A display device, including, in combination, a display front having a plurality of openings in the face thereof, a transparent panel disposed across one of said openings, means to retain said panel in position comprising a member extending across another of said openings, and card-holding means carried by said member and so positioned that a card held therein will be visible through said transparent panel.

28. A display device, including, in combination, a display front having a plurality of openings in the face thereof, a transparent panel disposed across one of said openings, a second panel disposed across another of said openings, means to retain said panels in position comprising an auxiliary retaining member engaging said panels, and a resilient strip engaging said member, said auxiliary member being formed with an opening adjacent said transparent panel and providing means to retain an indicia-bearing member in such position as to be displayed through the opening therein.

29. In a display device, in combination, a display front having a plurality of openings in the face thereof, panels to close said openings, one of said panels being formed of transparent material, spring means to thrust said panels against the face of said display front, a pocket member positioned adjacent said transparent panel for the display of articles therethrough, said pocket member comprising a pan-shaped body and outwardly-extending flanges each disposed between one of said panels and one of said spring means.

30. In a receptacle cover of the character described, the combination of a lid having a sight opening therein, a piece of transparent material substantially surrounded by lid parts at the edges of the transparent plate and overlying the sight opening, and a spring member extending substantially from side to side of the cover and overlying the plate and pressing upon it, the spring member being mounted at one side of the lid for swinging movements away from and toward the plate, and means at the opposite side of the lid for holding the spring member readily releasable in its holding position.

31. In a display front for boxes, a frame, a door hinged on the frame and having a display opening, a pan adapted to contain a display of the goods and to exhibit the same through the openings, and fastening elements engaging with the pan and the door for securing the same together.

32. The combination with the flanged frame and transparent plate of a receptacle cover lid of the character described, of a spring member extending alongside an edge portion of the plate and being mounted at one of its ends upon the frame for swinging movements toward and away from the plane of the plate and being formed to press upon the plate intermediate its ends when in plate-holding position, a flanged portion of the frame having a pocket-like catch near the free end of the spring member and opening toward the plane of the plate, said spring member having a projection at its free end normally directed away from the plane of the plate and toward said catch and being adapted readily to enter and to be moved out of the catch, the arrangement being such as to put the spring member under spring tension to hold the plate when said projection is in the catch.

In testimony whereof I have signed my name to this specification.

GEORGE A. TAYLOR.